United States Patent
Somalraju et al.

(10) Patent No.: US 12,481,574 B1
(45) Date of Patent: Nov. 25, 2025

(54) VEHICLE SOFTWARE EVALUATION

(71) Applicant: Zoox, Inc., Foster City, CA (US)

(72) Inventors: Selvamraju Somalraju, Mountain View, CA (US); Kaushik Raghu, San Bruno, CA (US); Yagnesh Srikanth Mathis, San Bruno, CA (US); Behrokh Mokhtarpour, San Francisco, CA (US); Man-Kit Leung, San Bruno, CA (US); Bharat V. Kulkarni, San Ramon, CA (US); Alexander Volpe Vartanian, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 293 days.

(21) Appl. No.: 18/139,758

(22) Filed: Apr. 26, 2023

(51) Int. Cl.
*B60W 60/00* (2020.01)
*B60W 50/02* (2012.01)
*G06F 8/65* (2018.01)
*G06F 11/362* (2025.01)

(52) U.S. Cl.
CPC ....... *G06F 11/366* (2013.01); *B60W 50/0225* (2013.01); *B60W 60/0016* (2020.02); *G06F 8/65* (2013.01)

(58) Field of Classification Search
CPC .... G06F 11/366; G06F 8/65; B60W 50/0225; B60W 60/0016
See application file for complete search history.

(56) References Cited

U.S. PATENT DOCUMENTS

| | | | |
|---|---|---|---|
| 9,792,656 B1* | 10/2017 | Konrardy | G08B 21/06 |
| 10,012,993 B1* | 7/2018 | Matus | G08G 1/0112 |
| 10,397,019 B2* | 8/2019 | Hartung | G05D 1/0077 |
| 11,741,274 B1 | 8/2023 | Crego et al. | |
| 2019/0138000 A1 | 5/2019 | Hammond et al. | |
| 2020/0166933 A1* | 5/2020 | Höfig | H04L 63/126 |
| 2022/0005291 A1* | 1/2022 | Konrardy | B60W 60/0015 |
| 2022/0118991 A1 | 4/2022 | Chen et al. | |
| 2023/0192139 A1* | 6/2023 | Kumavat | B60W 50/0098 701/25 |

OTHER PUBLICATIONS

Office Action for U.S. Appl. No. 17/514,614, dated May 14, 2025, 15 Pages.

* cited by examiner

*Primary Examiner* — Masud Ahmed
(74) *Attorney, Agent, or Firm* — Lee & Hayes, P.C.

(57) ABSTRACT

Techniques for evaluating and controlling vehicles based on the reliability of their software components are described herein. In some cases, a method may include receiving an exposure duration associated with a first scenario and a first operational domain; determining, based at least in part on the exposure duration and a failure rate associated with a first software component of a vehicle, a first fault rate for the first software component; determining a first evaluation measure for the first software component with respect to the first scenario, the first operational domain, and a first energy level, based at least in part on: (i) the first fault rate, and (ii) a second exposure measure associated with the first scenario, first operational domain, and the first energy level; and controlling the vehicle based at least in part on the first evaluation measure.

17 Claims, 6 Drawing Sheets

VEHICLE SOFTWARE EVALUATION

BACKGROUND

Autonomous vehicles are becoming increasingly popular due to their potential to revolutionize transportation, making it safer and more efficient. An autonomous vehicle relies heavily on software components to perform functions such as perception, decision making, and control. As such, ensuring the quality and reliability of these software components is important for the safe operation of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
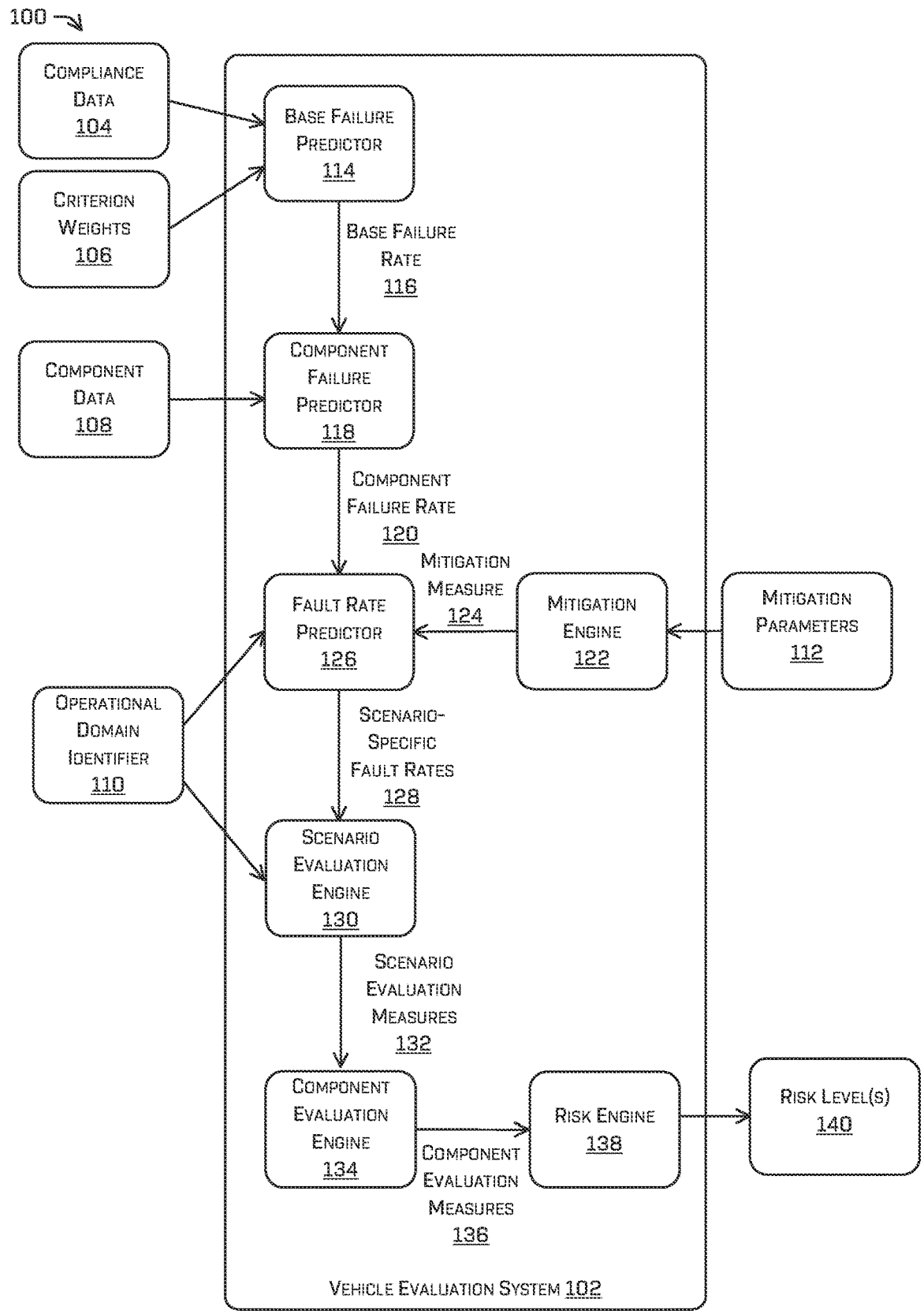
FIG. 1 is a data flow diagram of an example process for determining one or more risk levels associated with a software component of a vehicle.

As discussed above, autonomous vehicles rely heavily on software components to perform functions such as perception, decision making, and control.

This document describes techniques for evaluating and controlling autonomous vehicles based on reliability of their software components, and updating software components of an autonomous vehicle to improve their reliability and/or improve the safety and performance of the autonomous vehicle. An example system can use the techniques described herein to assess reliability of individual software components executing on vehicle computing device(s) of an autonomous vehicle or groups of software components that are configured to perform a set of related tasks. In the case of an autonomous vehicle or other similar system, the complexity of the system may preclude other techniques from providing a metric indicative of reliability and/or safety. In some cases, the techniques described herein increase reliability of vehicle computing device(s) associated with an autonomous vehicle to enable the vehicle to operate in compliance with relevant traffic regulations and to avoid collisions with other objects in the vehicle environment. Accordingly, the techniques discussed herein may improve the safety of occupants of an autonomous vehicle that incorporates the techniques discussed herein. Moreover, the techniques may improve the efficiency of an autonomous vehicle in accomplishing a mission such as, for example, delivering passengers and/or cargo, surveying a region, or the like.

In some cases, the example system determines a base failure rate for a software component based on the extent to which compliance data associated with the component satisfy one or more compliance criteria associated with a risk category. For example, the example system may determine the base failure rate based on a number of scoring conditions satisfied by the software component, where the set of applicable scoring conditions may relate to, for example, an Automotive Safety Integrity Level (ASIL) rating of the software component. However, in other examples, other scoring or rating systems may be used. After determining the base failure rate for the software component, the example system may determine a component failure rate for the software component based on the base failure rate and other component data associated with the software component (e.g., based on at least one of a single lines of code (SLOC) count measure associated with all of the software component's code, a SLOC count measure associated with a safety-related subset of the software component's code, or a diagnostic coverage measure associated with the vehicle).

In some cases, after determining the component failure rate for the software component, the example system applies a probability distribution (e.g., a Poisson distribution) to a variable determined based on the component failure rate to determine a set of S scenario-specific fault rates for the software component. Each scenario-specific fault rate may represent an expected number of faults caused by the software component during an event and while the vehicle is operating in accordance with one of S operational scenarios. In some cases, the example system may apply the probability distribution to a variable determined based on the component failure rate, a mitigation measure for the vehicle, and/or a scenario exposure duration (e.g., an exposure duration) for an associated scenario with respect to an operational domain (e.g., an operational design domain (ODD)) of the vehicle to determine the scenario-specific fault rate for the software component with respect to the associated scenario. As a non-limiting example of which, a vehicle may be associated with detecting and reacting to a number of pedestrians in a city-environment, negotiating a number of obstacles on a high-speed freeway in the rain at night, and the like. After determining the scenario-specific fault rate for the software component with respect to a given operational scenario, the example system may determine C categorical exposure measures for the given scenario with respect to C energy levels. Each categorical exposure measure may represent a measure of exposure of the software component contributing to costs associated with an associated energy level while the vehicle is operating in accordance with the associated operational scenario and in the operational domain of the vehicle.

Accordingly, in some cases, the example system determines S scenario-specific fault rates and S*C categorical exposure measures for the software component, where S is the number of applicable operational scenarios and C is the number of energy levels. In some cases, after determining the S scenario-specific fault rates and the S*C categorical exposure measures, the example system determines S*C scenario evaluation measures. Each scenario evaluation measure may: (i) represent an expected risk of the software component contributing to costs associated with an associated energy level while the vehicle is operating in accordance with the associated operational scenario and in the operational domain of the vehicle, and (ii) be determined based on the scenario-specific fault rate associated with the associated operational scenario and the categorical exposure measure for the associated operational scenario and the associated energy level.

Accordingly, in some cases, the example system determines S*C scenario evaluation measures for the software component, where S is the number of applicable operational scenarios and C is the number of energy levels. In some cases, after determining S scenario evaluation measures associated with a given energy level, the system combines (e.g., sums up, averages, etc.) S scenario evaluation measures to generate a component evaluation measure for the given energy level. Each component evaluation measure may represent an expected risk of the software component contributing to costs associated with an associated energy level. Accordingly, the example system may determine C component evaluation measures for the software component. The example system may then use the C component evaluation measures to determine a risk level for the software component and/or a risk level for the autonomous vehicle associated with the software component. The risk level may represent a probability of collision, injury, and/or fatality of one or more occupants of the vehicle or others (e.g., occupants of other vehicles, pedestrians, bicyclists, etc.) in an environment in which the vehicle is configured operate. The example system may then use the determined risk levels to determine whether to approve the software component for operation, determine whether to approve the vehicle for operation, control the operation of the software component, and/or control the operation of the vehicle. In at least some such examples, the techniques may define an acceptable ODD based on the evaluation (e.g., the vehicle is approved to drive in daylight in slow speeds, such as in cities). The example system may also be used to determine whether and/or how to update one or more software components to improve performance and/or safety of the vehicle.

In some cases, the techniques described herein include determining a base failure rate for a software component. The base failure rate may represent a predicted rate of failure for the software component as determined based on the extent to which the software component satisfies applicable compliance criteria associated with a risk category of the software component. The applicable compliance criteria may include software safety requirements, software architectural design requirements, software unit design and implementation requirements, software unit verification requirements, software integration and verification requirements, tool qualification requirements, configuration management requirements, static analysis requirements, architectural analysis requirements, and/or the like.

In some cases, the example system may determine the base failure rate based on a risk category of the software component. A risk category may represent a grouping of software applications that have common applicable evaluation measures. For example, risk categories may correspond to Automotive Safety Integrity Level (ASIL) risk categories defined by ISO 26262. ISO 26262 is a safety standard for road vehicles that aims to ensure safety throughout the entire lifecycle of an automotive system. ASIL is a risk classification system used in ISO 26262 to determine the safety requirements for a software component. There are four ASIL levels (ASIL A, ASIL B, ASIL C, and ASIL D) based on the severity of the potential harm that can be caused by a malfunctioning component. The higher the ASIL level, the more stringent the safety requirements are. In some cases, in the context of software for autonomous vehicles, ASIL D is the highest level of safety, and it is associated with the most stringent safety requirements. For example, ASIL D may be associated with software components that are critical to the safety of the vehicle, such as the steering, braking, and acceleration components. In some cases, ASIL C may be associated with software components that could cause serious injury or death, such as the sensors and cameras used for object detection and collision avoidance. ASIL B may be associated with software components that could cause injury or property damage, such as the software that controls the air conditioning or entertainment systems. ASIL A may be the lowest level of safety and may be associated with components that have no safety impact, such as the software that controls the interior lighting.

In some cases, each risk category is associated with applicable compliance criteria. Accordingly, in some cases, the set of compliance criteria associated with the software component include the set of compliance criteria associated with the risk category of the software component. In some cases, in addition to the set of compliance criteria, the risk category defines a criterion weight for each compliance criterion. Accordingly, in some cases, the software component is associated with a set of compliance criteria and, for each compliance criterion, a criterion weight, where at least one of the set of compliance criteria or the set of criterion weights are determined based on the associated risk category. Examples of compliance criteria may include a requirement that measures whether a clear traceability exists between high-level and low-level requirements of the software.

In some cases, the weight associated with a compliance criterion may be determined based on how important the compliance criterion is to the operational reliability of a software component. For example, a compliance criterion that measures how much the software component complies with high-level software requirements (e.g., safety, functional, fault handling, fault reporting, and/or interface requirements) may have a higher weight than a compliance criterion that measures how much the software component complies with cyclomatic complexity goals. In some cases, a compliance criterion that measures how much the software component has bugs as determined during static analysis has a highest possible weight.

In some cases, to determine the base failure rate for the software component, the example system uses a weighted compliance score for each compliance criterion that is determined based on (e.g., by multiplying) the criterion weight for the compliance criterion by a compliance score for the compliance criterion as determined based on the compliance data for the software component. For example, in some cases, the example system determines the base failure based on a weighted compliance ratio. The weighted compliance ration may be a ratio of: (i) the sum of weighted compliance scores for the software component across the compliance criteria, and (ii) the sum of the maximum possible weighted compliance scores across the compliance criteria. Accordingly, in some cases, the base failure rate may represent a weighted measure of the extent to which the software component satisfies the applicable compliance criteria.

For example, suppose the set of compliance criteria include: (i) a first criterion having a weight of 5 that measures how much a software component in a corresponding risk category complies with high-level requirements for the corresponding risk category, and (ii) a second criterion having a weight of 4 that measures how much the software component in the corresponding risk category complies with low-level requirements for the corresponding risk category.

Suppose further that if the software component that is compliant with less than 20 percent of the corresponding high-level requirements is assigned a compliance score of 1 for the first criterion, if the software component that is compliant with between 20 to 40 percent of the corresponding high-level requirements is assigned a compliance score of 2 for the first criterion, if the software component that is compliant with between 40 to 60 percent of the corresponding high-level requirements is assigned a compliance score of 3 for the first criterion, if the software component that is compliant with between 60 to 80 percent of the corresponding high-level requirements is assigned a compliance score of 4 for the first criterion, and if the software component that is compliant with between 80 to 100 percent of the corresponding high-level requirements is assigned a compliance score of 5 for the first criterion. Similarly, suppose that if the software component that is compliant with less than 20 percent of the corresponding low-level requirements is assigned a compliance score of 1 for the second criterion, if the software component that is compliant with between 20 to 40 percent of the corresponding low-level requirements is assigned a compliance score of 2 for the second criterion, if the software component that is compliant with between 40 to 60 percent of the corresponding low-level requirements is assigned a compliance score of 3 for the second criterion, if the software component that is compliant with between 60 to 80 percent of the corresponding low-level requirements is assigned a compliance score of 4 for the second criterion, and if the software component that is compliant with between 80 to 100 percent of the corresponding low-level requirements is assigned a compliance score of 5 for the second criterion.

In the example described in the preceding paragraph, if a first software component is compliant with 18 percent of its corresponding high-level requirements and 88 percent of its corresponding low-level requirements, then: (i) the compliance scores for the first software component may be 1 and 5 for the first and second criteria respectively, (ii) the weighted compliance scores for the first software component may be 5 (1*5) and 20 (5*4) across the first and second criteria respectively, and (iii) the weighted compliance ratio for the first software component may be 25/45 ((5+20)/(25+20)).

In some cases, to determine the base failure rate for the software component, the example system first determines a weighted compliance ratio. After determining the weighted compliance ratio, the example system may process the weighted compliance ratio by a base failure rate model associated with the risk category associated with the software component. The base failure rate model may be configured to map a weighted compliance ratio for a software component associated with a particular risk category to a base failure rate for the software component. For example, the base failure rate may include a base failure rate calculation function and/or a base failure rate calculation curve. In some cases, each risk category may be associated with a base failure rate calculation function and/or a base rate calculation curve that maps the weighted compliance ratio values for software components associated with the risk category to corresponding base failure rates. The base failure rate calculation function and/or the base rate calculation curve for a risk category may be determined based on the following assumptions: (i) the worst-case base failure rate may be assumed to be 1E-4/hour and may be assumed to be associated with a weighted compliance ratio of zero, and (ii) the best-case base failure rate may be assumed to be the same as the best-case random hardware failure target rates for different risk categories (e.g., ASIL categories). For example, the base-case base failure rates may be determined based on target rates defined by ISO 26262 Part 5, Table 6 (e.g., 1E-5/hour for ASIL A, 1E-7/hour for ASTL B, 1E-7/hour for ASTL C, and 1E-8/hour for ASIL D).

In some cases, the techniques described herein include determining a component failure rate for a software component. The component failure rate may represent a predicted rate of failure for the component as determined based on the component's base failure rate as well as one or more additional features associated with the software component. Examples of such additional component features include a SLOC count measure that represents a number of code lines associated with the codebase for the software component, a SLOC count measure that represents a number of code lines associated with a subset of the component's codebase (e.g., a subset related to one or more safety-related operations of the software component), a diagnostic coverage measure for the software component, a ratio of the codebase of the software component that relates to one or more safety-related operations of the software component, or other examples of measures representing the size of all or a subset of the codebase associated with the software component.

The diagnostic coverage measure may represent a predicted effectiveness of any available mechanisms that could potentially prevent a failure of the software component. In some cases, the diagnostic coverage measure is determined based on a discrete diagnostic coverage level associated with the software component. For example, in some cases, a first software component that is associated with a "high" diagnostic coverage level is associated with a first diagnostic coverage measure that is different from a second diagnostic coverage measure of a second software component associated with the a "low" diagnostic coverage level. In some cases, if the level of confidence in the failure prevention mechanisms for the software component is 99 percent or higher, the software component is assigned a "high" diagnostic coverage level. In some cases, if the level of confidence in the failure prevention mechanisms for the software component is less than 99 percent but 90 percent or higher, the software component is assigned a "medium" diagnostic coverage level. In some cases, if the level of confidence in the failure prevention mechanisms for the software component is less than 90 percent but 60 percent or higher, the software component is assigned a "low" diagnostic coverage level.

In some cases, the techniques described herein include determining a mitigation measure for the vehicle. The mitigation measure may represent a reduction in risk that can be expected due to detection and/or mitigation mechanisms that are configured to flag and/or prevent hazardous events at the vehicle level. In some cases, the example system may determine the mitigation measure based on at least one of a mechanism effectiveness measure, an external unpredictability measure, and/or a component confidence measure.

The mechanism effectiveness measure may represent a predicted effectiveness of any mechanisms associated with the vehicle that are configured to detect a potential collision and transition the vehicle to a safe state. In some cases, the mechanism effectiveness measure is determined based on a discrete mechanism effectiveness level associated with the software component. For example, in some cases, a first software component that is associated with a "high" mechanism effectiveness level is associated with a first mechanism effectiveness measure that is different from a second mechanism effectiveness measure of a second software component associated with the a "low" mechanism effectiveness level.

Examples of mechanisms that are configured to detect a potential collision and transition the vehicle to a safe state include collision avoidance mechanisms and teleguidance mechanisms.

The external unpredictability measure may represent a measure of the extent to which any other objects and/or other agents in the vehicle environment are predicted to perform actions to successfully evade collision with the vehicle. In some cases, the external unpredictability measure may represent a probability that other objects and/or other agents in the vehicle environment will be unable to perform actions to successfully evade collision with the vehicle. In some cases, the external unpredictability measure represents a probability of collision.

The component confidence measure may represent a measure of confidence in the software component as determined based on the results of performing one or more tests that relate to the software component. For example, the component confidence measure may represent a measure of confidence in the software component as determined based on the results of performing one or more software unit level tests on the software component and/or one or more hardware-software integration level tests on a hardware component that operates using the software component. In some cases, the example system may determine the component confidence measure based on the amount of time the software component has been subject to bot-level and/or vehicle level testing. In some cases, bot-level testing refers to testing the software component of an autonomous vehicle using automated bots, also known as virtual drivers or simulators. In some cases, in bot-level testing, the software component is tested by running a simulation of the autonomous vehicle system under various operating conditions, such as different traffic scenarios, weather conditions, and road layouts. The virtual drivers or simulators may be designed to mimic real-world driving behavior and to interact with the software component as a human driver would.

In some cases, the techniques described herein include determining a set of scenario-specific fault rates for a software component. The scenario-specific fault rate may represent an expected number of faults caused by the software component during a hazardous event and while the vehicle is operating in accordance with one of S operational scenarios and in a particular operational domain. Accordingly, each scenario-specific fault rate may be associated with a corresponding software component, a corresponding operational domain, and a corresponding operational scenario. The operational domain may represent one or more features associated with a particular vehicle environment (e.g., a current vehicle environment). Examples of relevant environment features include time of day, weather, terrain, locality, and roadway features. The operational scenario may represent a state (e.g., a hypothetical state) in which the vehicle may be operating. A vehicle's state may represent at least one of a feature of an environment of the vehicle or an action that the vehicle may be performing. Examples of operational scenarios include a scenario related to following a lane, a scenario related to following a lane while a static object is outside of the vehicle's lane, a scenario related to following a lane while a pedestrian is outside of the vehicle's lane, a scenario related to following a bicycle while a pedestrian is outside of the vehicle's lane, a scenario related to following a lane while a bicycle is outside of the vehicle's lane, a scenario related to following a lane while a static object is in the vehicle's lane, a scenario related to following a lane while a pedestrian is in the vehicle's lane, a scenario related to following a bicycle while a pedestrian is in the vehicle's lane, or a scenario related to following a lane while a bicycle is in the vehicle's lane.

In some cases, the example system determines a scenario-specific fault rate based on: (i) the component failure rate for the associated software component, (ii) the mitigation measure for the vehicle associated with the software component, and/or (iii) a scenario exposure duration for the associated operational scenario and the associated operational domain. For example, the example system may determine the scenario-specific fault rate by applying a probability distribution (e.g., a Poisson distribution) to a variable determined based on the component failure rate, the mitigation measure, and/or the scenario exposure duration. The scenario exposure duration may represent an expected measure of exposure (e.g., an expected duration of exposure, an expected frequency of exposure, and/or the like) of a vehicle that is in the associated operational domain to the associated operational scenario. For example, a first scenario exposure duration may represent an expected duration of exposure of a vehicle that is operating in the particular region (e.g., a particular city, neighborhood, or operational drive domain) to a scenario related to following a lane while a static object is in the vehicle's lane.

In some cases, the techniques described herein include determining a set of scenario evaluation measures for a software component. A scenario evaluation measure may represent an expected risk of the software component contributing to costs associated with an associated energy level while the vehicle is operating in accordance with the associated operational scenario and in a given operational domain. Accordingly, a scenario evaluation measure may be associated with a corresponding software component, a corresponding operational scenario, a corresponding operational domain, and a corresponding energy level. An energy level may represent a severity level of a collision and/or a type of loss that may result from faulty operation of a software component. Examples of energy levels include a low energy level (e.g., associated with a collision without fatality or injury), a medium energy level (e.g., associated with a collision with injury but without fatality), and a high energy level (e.g., associated with a collision with fatality).

In some cases, the example system determines a scenario evaluation measure based on: (i) the scenario-specific fault rate for the associated software component, the associated operational domain, and the associated operational scenario, and/or the (ii) a categorical exposure measure for the associated energy level, the associated operational domain, and the associated operational scenario. For example, the example system may determine the scenario evaluation measure based on a product of the scenario-specific fault rate and the categorical exposure measure. A categorical exposure measure may represent a measure of exposure (e.g., an expected exposure rate) of the software component contributing to costs associated with the associated energy level while the vehicle is operating in accordance with the associated operational scenario and in the associated operational domain. In some cases, categorical exposure measures (e.g., expected exposure rates) for different energy levels given specific driving scenarios are determined based on statistical data. This statistical data may be gathered through various sources, such as accident reports, police records, and surveys, and may be used to calculate the likelihood of a collision of a given severity under certain scenarios.

In some cases, the techniques described herein include determining a set of component evaluation measures for a software component. A component evaluation measure may represent an expected risk of the software component contributing to costs associated with an associated energy level while the vehicle is operating in an associated operational domain. Accordingly, a component evaluation measure may be associated with a corresponding software component, a corresponding operational domain, and a corresponding energy level. For example, a first cost evaluation measure may represent an expected risk of the software component to cause collisions of a particular energy level while the vehicle is operating in a particular region.

In some cases, the example system determines a component evaluation measure by combining (e.g., summing up, averaging, and/or the like) the scenario evaluation measures for the associated software component, the associated operational domain, and the associated energy level across a set of S applicable operational scenarios. For example, to determine a first cost evaluation measure that represents an expected risk of the software component to cause a collision with a high energy level while the vehicle is operating in the particular region, the example system may combine: (i) a first scenario evaluation that represents an expected risk of the software component to cause a collision with a high energy level while the vehicle is operating in the particular region and in accordance with a scenario related to following a lane, (ii) a second scenario evaluation that represents an expected risk of the software component to cause a collision with a high energy level while the vehicle is operating in the particular region and in accordance with a scenario related to following a lane while a static object is outside of the vehicle's lane, and (iii) a third scenario evaluation that represents an expected risk of the software component to cause a collision with a high energy level while the vehicle is operating in the particular region and in accordance with a scenario related to following a lane while a pedestrian is outside of the vehicle's lane.

In some cases, the techniques described herein determining a component risk level for a software component based on a set of component evaluation measures for the software component. In some cases, the example system determines the component's risk level based on a set of C component evaluation measures for the software component across a set of C energy levels. For example, the example system may determine the component's risk level based on a first component evaluation measure for the software component in relation to a high energy level, a second component evaluation measure for the software component in relation to a medium energy level, and a third component evaluation measure for the software component in relation to a low energy level.

In some cases, to determine the component risk level, the example system: (i) determines the set of C component evaluation measures for the software component, (ii) determines a set of C target evaluation measures for the software component, and (iii) determines the component risk level based on the two sets of evaluation measures. C may be the number of defined energy levels. A target evaluation measure may represent a component evaluation measure for the software component that is determined based on a predefined base failure rate (e.g., not the base failure rate computed based on the computed weighted compliance ratio for the component). For example, the target evaluation measure may represent a component evaluation measure that is determined based on a base failure rate, where the base failure rate is determined based on a total (e.g., 100 percent) weighted compliance ratio. In other words, the target evaluation measure may represent what the component evaluation measure for the software component would be if the software component satisfied all of the compliance criteria associated with the component's risk category. In some cases, to determine the target evaluation measure for the software component, the example system: (i) determines a second base failure rate based on a predefined (e.g., total) weighted compliance ration, (ii) determines a second component failure rate based on the first base failure rate, (iii) determines a second set of scenario-specific fault rates based on (e.g., by applying a probability distribution to a variable determined based on) the second component failure rate (e.g., and at least one of the mitigation measure for the software component or a set of scenario exposure durations), (iv) determines a second set of scenario evaluation scores based on the second set of scenario-specific fault rates (e.g., and a set of categorical exposures measures), and (v) determines the set of target evaluation measures based on the second set of scenario evaluation scores (e.g., by combining the second scenario evaluation scores across energy levels).

Accordingly, a target evaluation measure may: (i) represent an expected risk of the software component contributing to costs associated with an associated energy level while the vehicle is operating in an associated operational domain, if the software component satisfied all of the applicable compliance criteria, and (ii) is associated with a corresponding energy level. Thus, an energy level may be associated with a component evaluation measure and a target evaluation measure. For example, the high energy level may be associated with: (i) a component evaluation measure that represents an expected risk of the software component contributing to collisions with the high energy level while the vehicle is operating in an associated operational domain, and (ii) a target evaluation measure that represents an expected risk of the software component contributing to collisions with the high energy level while the vehicle is operating in the associated operational domain if the software component satisfied all of the applicable compliance criteria.

In some cases, to determine the component risk level, the example system: (i) determines a set of C residual evaluation measures based on the set of C component evaluation measure and the set of C target evaluation measures, and (ii) determines the component risk level based on the set of C residual evaluation measures. C may be the number of defined energy levels. A residual evaluation measure may represent a measure of deviation between: (i) a component evaluation measure for an associated software component, an associated operational domain, and an associated energy level, and (ii) a target evaluation measure for the associated software component, the associated operational domain, and the associated energy level. For example, a residual evaluation measure for the high energy level category may represent deviation between: (i) a component evaluation measure that represents an expected risk of the associated software component contributing to collisions with the high energy level while the vehicle is operating in the associated operational domain, and (ii) a target evaluation measure that represents an expected risk of the associated software component contributing to collisions with the high energy level while the vehicle is operating in the associated operational domain if the software component satisfied all of the applicable compliance criteria.

Accordingly, in some cases, the example system may determine the component risk level based on the set of residual evaluation measures associated with the software component. For example, in some cases, given a set of C residual evaluation measures, the example system may: (i) map each residual evaluation measure to a respective risk level, and (ii) determine the component risk level based on at least one of the respective risk levels for the C residual evaluation measures (e.g., based on the highest level of risk among the respective risk levels). Examples of risk levels include de minimis, low, medium, and high. In some cases, the component risk level may represent whether the component is determined to be safe to operate in an associated operational domain.

In some cases, the techniques described herein include determining whether to validate a software component and/or a vehicle based on a component risk level associated with the software component. In some cases, the example system determines to validate the software component if the component risk level for the software component satisfies a threshold condition. In some cases, the example system determines to validate the vehicle if the component risk levels for one or more software components of the vehicle satisfy one or more defined threshold conditions. If the software component fails validation, the example system may disable operation of the component and enable operation of an alternative (e.g., fail safe) component that performs the same task as the software component. In some cases, the example system determines whether a produced vehicle can successfully exit the production process based on a validation determination for the vehicle and/or for one or more software components of the vehicle.

In some cases, the techniques described herein include controlling a vehicle based on a component risk level associated with a software component. In some cases, controlling the vehicle includes operating the vehicle in a manner that avoids autonomous navigation and/or completely avoids any operational domain whose associated component risk levels fails to satisfy defined threshold condition(s). In some embodiments, the example system controls an autonomous vehicle based on the component risk level by determining a vehicle risk level based on the component risk level and controlling the autonomous vehicle in an associated with operational domain based on whether the vehicle risk level satisfies a threshold condition. If the vehicle risk level fails to satisfy the threshold, the example system may determine a path for the vehicle that avoids a region associated with the operational domain or control the vehicle based on a stopping trajectory when the vehicle is detected to be in a region associated with the operational domain.

In some cases, the techniques described herein provide a comprehensive framework for assessing the reliability and risk of software components in autonomous vehicles, enabling safer and more efficient operation of these vehicles in various operational domains and scenarios. By using the evaluation score and component risk score, the example system can dynamically adjust the autonomous vehicle's behavior to minimize the risk of accidents and improve overall performance.

In some cases, the techniques described herein enable continuous monitoring and updating of the software components' reliability and risk assessment. As the autonomous vehicle operates in various environments and encounters different scenarios, the example system collects data and updates the scenario exposure durations, categorical exposure measures, and/or failure rates. This ensures that the assessment of software components remains up-to-date and reflects the latest operational experiences of the autonomous vehicle. The system may also incorporate machine learning techniques to improve the accuracy and adaptability of its assessment. By using machine learning algorithms, the system can identify patterns and trends in the data, better predict the likelihood of software component failures, and adapt the evaluation score and component risk score accordingly. This allows the system to not only react to changes in the operational environment but also proactively adjust the vehicle's behavior based on anticipated risks. In some embodiments, the system may be configured to communicate with other autonomous vehicles or infrastructure elements, such as traffic signals, road sensors, or other connected devices. This communication can provide additional data and context for the scenario exposure duration, categorical exposure measure, and/or failure rate calculations, further enhancing the accuracy of the reliability and risk assessment.

In some cases, the techniques discussed herein can be implemented to facilitate and/or enhance safety of automated navigation features in vehicles, such as in automated vehicles or semi-automated vehicles. For example, the example system can be configured to provide alerts or recommendations to human operators, maintenance personnel, or other stakeholders involved in the operation and management of the autonomous vehicle. These alerts or recommendations may include information about software component reliability, component risk scores, or suggested actions to mitigate risks or improve the performance of the autonomous vehicle.

In some cases, the techniques discussed herein provide a comprehensive and adaptable system for evaluating and controlling autonomous vehicles based on the reliability and risk assessment of their software components. By determining scenario failure rates, evaluation scores, and component risk scores, and by controlling the autonomous vehicle based on these assessments, the example system may enable safer and more efficient operation of autonomous vehicles in various operational domains and scenarios. The system's ability to continuously update its assessments, incorporate machine learning techniques, and communicate with external devices may further enhance its effectiveness and adaptability, ensuring optimal performance of the autonomous vehicle in a dynamic and complex environment.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using computer vision techniques, and are not limited to vehicles. Moreover, although various operations are described as being performed by a planning component of a vehicle computing device, a person of ordinary skill in the relevant technology will recognize that the planning component may be deployed on other computing devices, such as on a remote computing device that communicates with a vehicle computing device using a networked connection.

FIG. 1 is a data flow diagram of an example process 100 for determining one or more risk levels 140 for a first software component of a vehicle. As depicted in FIG. 1, a vehicle evaluation system 102 processes a set of inputs to determine the risk levels 140. The inputs to the process 100 include compliance data 104, criterion weights 106, component data 108, an operational domain identifier 110, and a set of mitigation parameters 112.

The compliance data 104 may include data representing whether the first software component of the vehicle satisfies one or more applicable compliance criteria. The compliance data 104 may be determined based on user-provided inputs (e.g., provided by one or more inspectors of the vehicle), data determined via performing one or more automatic verification or testing operations on the vehicle, and/or the like. Each compliance data field may be associated with a compliance criterion. A compliance criterion may be a scoring condition specified for software components associated with a particular risk category (e.g., ASIL rating).

The criterion weights 106 may include data representing a weight for each applicable compliance criterion. In some cases, the risk category of the first software component is associated with a respective criterion weight for each compliance criterion. Accordingly, in some cases, a compliance criterion may be weighted higher when used to evaluate a software component having a first risk category than a software component having a second risk category. As a non-limiting example of which, in those instances in which a weight is assigned between 0 and 1 (inclusive), a software component which determines when to brake may be associated with a 1 whereas a software component which determines when to turn off the air conditioning may be associated with a 0.1. Such weights may be input by a user and/or determined based on tests which remove components and determine changes in behavior in a simulated environment with higher divergences receiving a higher weight.

The component data 108 may include one or more features of the first software component that may be used to determine the component failure rate 120 for the first software component. Examples of such component features include a SLOC count measure that represents a number of code lines associated with the codebase for the first software component, a SLOC count measure that represents a number of code lines associated with a subset related to one or more safety-related and/or safety-critical operations of the first software component, a diagnostic coverage measure for the first software component, a ratio of the codebase of the first software component that relates to one or more safety-related operations of the first software component, or other examples of measures representing the size of all or a subset of the codebase associated with the first software component. A safety-related subset of a software component may refer to a portion of a software codebase of the component that is specifically designed and implemented to address safety-critical aspects of the software system. The safety-related subset of code typically may contain the critical functions and algorithms that are responsible for ensuring the safe and reliable operation of the software. For example, safety-related and/or safety-critical operations of the perception system of an autonomous vehicle may include object detection, object classification, and obstacle detection. As another example, safety-related and/or safety-critical operations of the planning system of an autonomous vehicle may include trajectory validation and performing collision avoidance checks.

The operational domain identifier 110 may include data that uniquely represents an operational domain in which the first software component is being evaluated. The operational domain may represent one or more features associated with a particular vehicle environment (e.g., a current vehicle environment). An example of an operational domain is an ODD. An ODD describes a set of overlapping conditions, uses cases, restrictions, and scenarios that a vehicle may encounter.

The set of mitigation parameters 112 may include one or more features of the vehicle and/or the first software component that may be used to determine a mitigation measure 124 for the vehicle. Examples of mitigation parameters 112 include a mechanism effectiveness measure for the vehicle, an external unpredictability measure for the vehicle, and a component confidence measure for the first software component. The mechanism effectiveness measure may represent effectiveness of external safety mechanisms (e.g., external collision avoidance checking systems and/or teleguidance systems) that could detect a potential collision and transition the vehicle to a safety state. The external unpredictability measure may represent the probability of an external object in a vehicle's environment not being able to take action that can evade a collision. The component confidence measure may represent a measure of confidence in a software component as determined based on the amount of testing performed on the software component.

As depicted in FIG. 1, the process 100 includes determining a base failure rate 116 for the first software component using a base failure predictor 114 and based on the compliance data 104 and the criterion weights. In some cases, the base failure rate 116: (i) determines a weighted compliance ratio based on the compliance data 104 and the criterion weights, and (ii) determines the base failure rate 116 based on the weighted compliance ratio (e.g., by mapping the weighted compliance ratio to the base failure rate 116, for example using a base failure rate model). In some cases, the base failure rate 116 determines the weighted compliance ratio based on a ratio of a first sum of the criterion weights 106 for a subset of the compliance criteria that are satisfied by the compliance data 104 to a second sum of all of the criterion weights 106. Exemplary techniques for determining the base failure rate 116 are described below with reference to FIG. 2.

As further depicted in FIG. 1, the process 100 includes determining a component failure rate 120 for the first software component using a component failure predictor 118 based on the base failure rate 116 and the component data. For example, the component failure predictor 118 may determine the component failure rate 120 based on a product of the base failure rate 116 and the component features represented by the component data 108.

As further depicted in FIG. 1, the process 100 includes determining a mitigation measure 124 for the first software component using a mitigation engine 122 and based on the mitigation parameters 112. For example, the mitigation engine 122 may determine the mitigation measure 124 based on a product of the mitigation parameters 112.

As further depicted in FIG. 1, the process 100 includes determining a set of S scenario-specific fault rates 128 for the first software component using a fault rate predictor 126, where each scenario-specific fault rate is associated with a respective one of S operational scenarios. In some cases, to determine a scenario-specific fault rate, the fault rate predictor 126 uses: (i) the component failure rate 120 for the first software component, (ii) the mitigation measure 124 for the first software component, and (iii) a scenario exposure duration for the associated operational scenario and the associated operational domain. In some cases, to determine the S scenario-specific fault rates 128: (i) maps the operational domain identifier 110 to a first operational domain, (ii) determines S scenario exposure durations for the first software component with respect to S operational scenarios, and (iii) determines the S scenario-specific fault rates 128 based on the component failure rate 120, the mitigation measure 124, and the S scenario exposure durations. In some instances, such a component failure rate 120 may be modified based at least in part on the ratio of how often the component is exposed to a scenario relative to all scenarios, as well as any mitigating factors.

In some cases, the fault rate predictor 126 may determine a scenario-specific fault rate based on: (i) the mitigation measure 124, and (ii) a value determining by applying a probability distribution (e.g., a Poisson distribution) to a variable determined based on the component failure rate 120 and the associated scenario exposure duration. For example, the fault rate predictor 126 may determine a scenario-specific fault rate based on a product of: (i) the mitigation measure 124, and (ii) a value determining by applying a probability distribution (e.g., a Poisson distribution) to a variable determined based on the component failure rate 120 and the associated scenario exposure duration. Exemplary techniques for determining a scenario-specific fault rate are described below with reference to FIG. 3.

As further depicted in FIG. 1, the process 100 includes determining a set of S*C scenario evaluation measures 132 the first software component using a scenario evaluation engine 130, where each scenario evaluation measure is associated with a respective one of the S operational scenarios and a respective one of C energy levels. In some cases, the scenario evaluation engine 130 determines S*C scenario evaluation measures 132 by: (i) mapping the operational domain identifier 110 to the first operational domain, (ii) determining S*C categorical exposure measures for the first operational domain, and (iii) determining the S*C scenario evaluation measures 132 based on the S scenario-specific fault rates 128 and the S*C categorical exposure measures.

In some cases, the scenario evaluation engine 130 determines a scenario evaluation measure based on: (i) the scenario-specific fault rate for the associated operational scenario and the associated operational domain, and (ii) a categorical exposure measure for the associated operational scenario, the associated energy level, and the associated operational domain. For example, the scenario evaluation engine 130 may determine a scenario evaluation measure based on a product of: (i) the scenario-specific fault rate for the associated operational scenario and the associated operational domain, and (ii) a categorical exposure measure for the associated operational scenario, the associated energy level, and the associated operational domain. In some cases, statistical data about outcomes of various scenarios (e.g., about whether various scenarios lead to collisions of different energy levels) are provided through various sources, such as accident reports, police records, and surveys. Exemplary techniques for determining a scenario evaluation measure are described below with reference to FIG. 4.

As further depicted in FIG. 1, the process 100 includes determining a set of C component evaluation measures 136 using a component evaluation engine 134, where each component evaluation measure is a measure of safety of the software component with respect to a corresponding one of the C energy levels. In some cases, the component evaluation engine 134 determines C component evaluation measures 136 by combining (e.g., summing) each subset of the S*C scenario evaluation measures 132 associated with a common energy level.

As further depicted in FIG. 1, the process 100 includes determining the risk levels 140 using a risk engine 138 and based on the C component evaluation measures 136. In some cases, the risk engine 138 determines the risk levels 140 by processing the C component evaluation measures 136 to determine a set of evaluation risk measures (e.g., a set of C evaluation risk measures each associated with a respective energy level). In some cases, the risk engine 138 determines the set of residual evaluation measures based on the set of C component evaluation measures 136 and a second set of component evaluation measures associated with the first software component (e.g., a set of target evaluation measures associated with the first software component).

Examples of risk levels 140 include a component risk level for the first software component and a vehicle risk level for the corresponding vehicle. In some cases, the risk levels 140 can be used to determine whether to approve the first software component for operation, limit or otherwise restrain operation of the vehicle (e.g., to particular ODDs), determine whether to approve the vehicle for operation, control the operation of the first software component, and/or control the operation of the vehicle. Exemplary techniques for determining a component risk level are described below with reference to FIG. 5.

Figure 2:
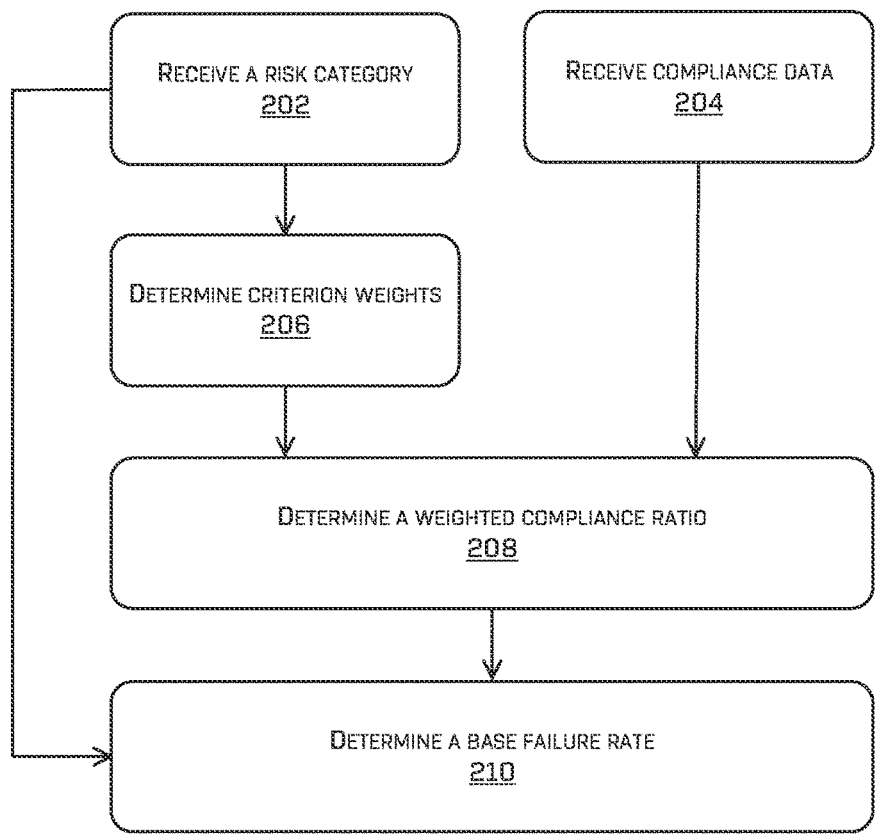
FIG. 2 is a flowchart diagram of an example process for determining a base failure rate for a software component.

FIG. 2 is a flowchart diagram of an example process 200 for determining a base failure rate for a first software component. As depicted in FIG. 2, at operation 202, the process 200 includes receiving a risk category of the first software application. The risk category may represent how important or the first software component is to safe and/or effective operation of the vehicle.

At operation 204, the process 200 includes receiving compliance data associated with the first software component. The compliance data may include the compliance data 104 of FIG. 1. For example, the compliance data may describe the level of compliance of a software component with high-level requirements, low-level requirements, and/or traceability requirements of a corresponding risk category. As another example, the compliance data may describe the results of static analysis of the code associated with a software component. Each compliance data field may be associated with a compliance criterion of a set of applicable compliance criteria. Accordingly, the compliance data may represent values indicating whether the first software component is determined to satisfy each of the applicable compliance criteria.

At operation 206, the process 200 includes determining a set of criterion weights. The set of criterion weights may include the criterion weights 106 of FIG. 1. A criterion weight may be a measure of significance of an associated compliance criterion to the risk category of the first software component.

At operation 208, the process 200 includes determining a weighted compliance ratio based on the compliance data and the set of criterion weights. The weighted compliance ratio is a ratio of: (i) the sum of weighted compliance scores for the software component across the compliance criteria, and (ii) the sum of the maximum possible weighted compliance scores across the compliance criteria.

At operation 210, the process 200 includes determining the base failure rate. The base failure rate may correspond to the base failure rate 116 of FIG. 1. Determining the base failure rate may include mapping the weighted compliance ratio to a base failure rate model. In some cases, the risk category of the first software component is associated with a respective base failure rate model that is different from the base failure rate models of other risk categories. Accordingly, in some cases, the base failure rate model used to determine the base failure rate is determined based on the risk category of the first software component.

Figure 3:
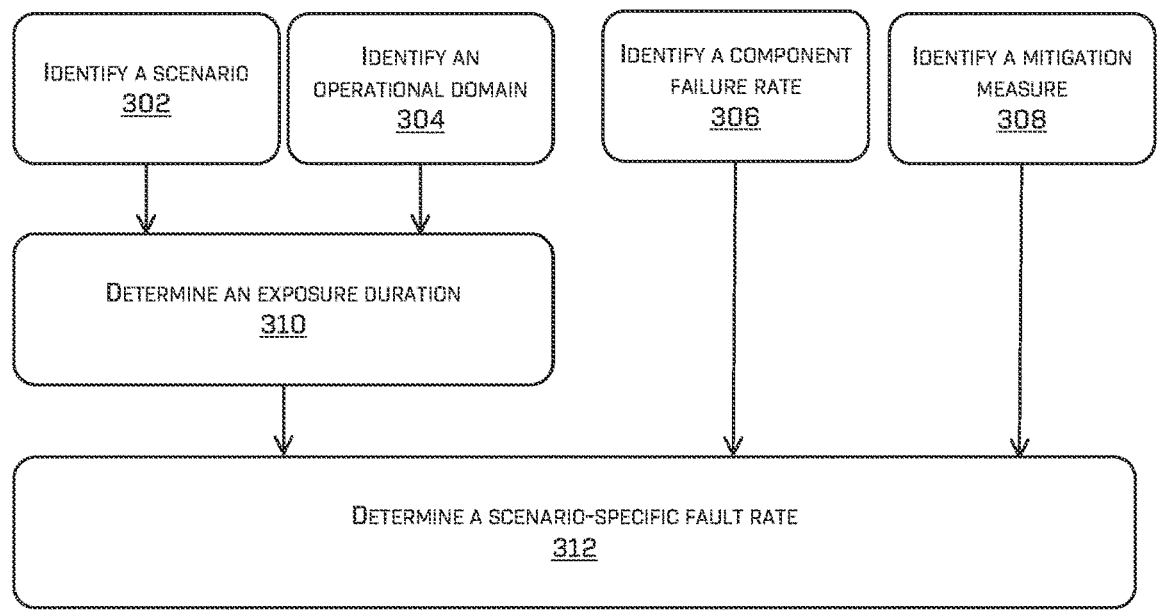
FIG. 3 is a flowchart diagram of an example process for determining a scenario-specific fault rate associated with a software component, operational scenario, and/or operational domain.

FIG. 3 is a flowchart diagram of an example process 300 for determining a scenario-specific fault rate associated with a first software component, a first operational scenario, and a first operational domain. As depicted in FIG. 3, at operation 302, the process 300 includes identifying the first operational scenario. The operational scenario may represent at least one of an assumed vehicle environment and/or an assumed vehicle feature.

At operation 304, the process 300 includes identifying the first operational domain. The first operational domain may be determined based on a received operational domain identifier, such as the operational domain identifier 110 of FIG. 1. As a non-limiting example of which, the ODD may be urban driving during business hours.

At operation 306, the process 300 includes identifying a component failure rate associated with the first software component. The component failure rate may correspond to the component failure rate 120 of FIG. 1. However, a person of ordinary skill in the relevant technology will recognize that other techniques for determining component failure rates for software components may also be used. The component failure rate may represent a predicted rate of failure for the component as determined based on the component's base failure rate as well as one or more additional features associated with the software component. Examples of such additional component features include a SLOC count measure that represents a number of code lines associated with the codebase for the software component, a SLOC count measure that represents a number of code lines associated with a subset of the component's codebase (e.g., a subset related to one or more safety-related operations of the software component), a diagnostic coverage measure for the software component, a ratio of the codebase of the software component that relates to one or more safety-related operations of the software component, or other examples of measures representing the size of all or a subset of the codebase associated with the software component.

At operation 308, the process 300 includes identifying a mitigation measure. The mitigation measure may correspond to the mitigation measure 124 of FIG. 1. However, a person of ordinary skill in the relevant technology will recognize that other techniques for determining mitigation measures for vehicles may also be used. The mitigation measure may represent a reduction in risk that can be expected due to detection and/or mitigation mechanisms that are configured to flag and/or prevent hazardous events at the vehicle level. In some cases, the example system may determine the mitigation measure based on at least one of a mechanism effectiveness measure, an external unpredictability measure, and/or a component confidence measure. The mechanism effectiveness measure may represent a predicted effectiveness of any mechanisms associated with the vehicle that are configured to detect a potential collision and transition the vehicle to a safe state. The external unpredictability measure may represent a measure of the extent to which any other objects and/or other agents in the vehicle environment are predicted to perform actions to successfully evade collision with the vehicle. The component confidence measure may represent a measure of confidence in the software component as determined based on the results of performing one or more tests that relate to the software component.

At operation 310, the process 300 includes determining a scenario exposure duration based on the first operational scenario and the first operational domain. The scenario exposure duration may be associated with the first operational scenario and the first operational domain. The scenario exposure duration may represent a likelihood that a vehicle operating in the first operational scenario will face any environmental circumstances and/or decision problems associated with the first operational domain. As an example of which, if compliance data is associated with all times of day, the scenario exposure duration for those ODDs associated with driving during business hours (e.g., 9 am to 5 pm) may be ⅓ (8 hours/24 hours). Of course, this is a simplistic example and the disclosure is not meant to be so limiting. In other examples, such exposure metrics may be based at least in part on a number of additional objects proximate the vehicle (e.g., pedestrians, cars, bicycles, etc.), time of day, vehicle driving speed, weather conditions, time of year, etc.

At operation 312, the process 300 includes determining the scenario-specific fault rate based on the component failure rate, the mitigation measure, and the scenario exposure duration. The scenario-specific fault rate may correspond to one of the S scenario-specific fault rates 128 of FIG. 1. In some case, the scenario-specific fault rate is determined based on: (i) a value determined by applying a probability distribution to the component failure rate and the scenario exposure duration, and (ii) the mitigation measure. For example, the scenario-specific fault rate may be determined as the product of: (i) the value determined by applying a probability distribution to the component failure rate and the scenario exposure duration, and (ii) the mitigation measure.

Figure 4:
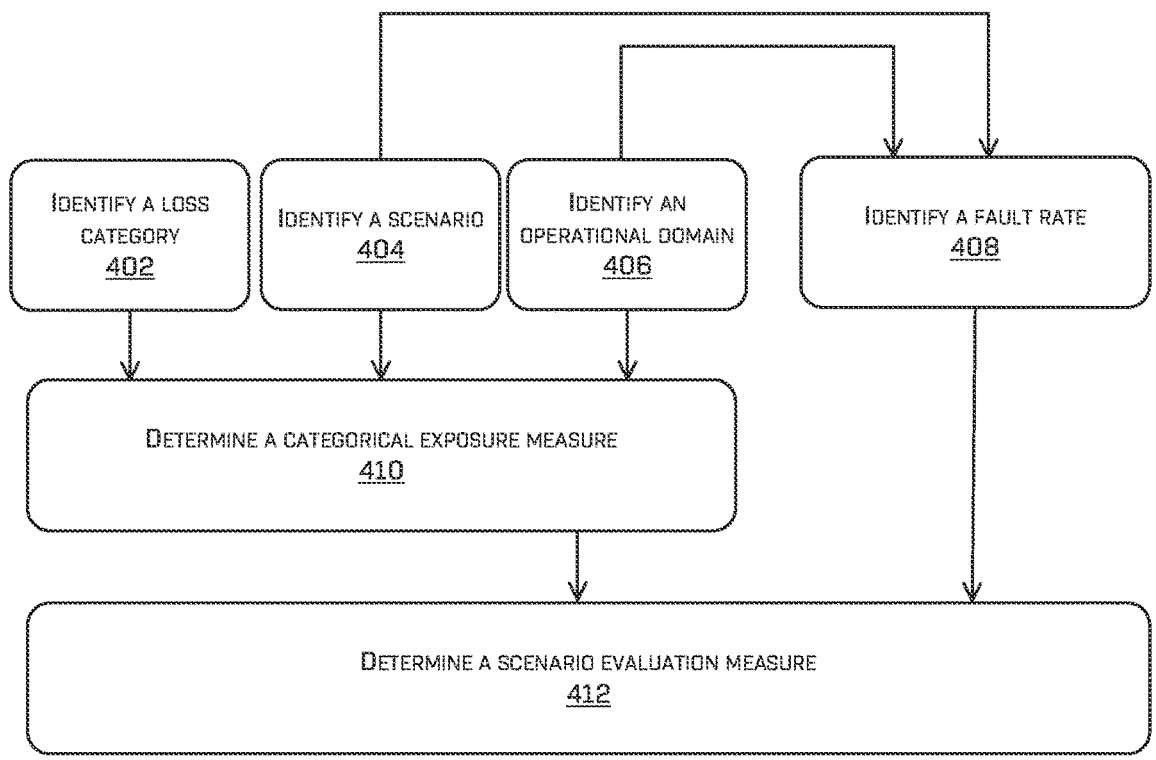
FIG. 4 is a flowchart diagram of an example process for determining a scenario evaluation score associated with a software component, operational scenario, operational domain, and/or energy level.

FIG. 4 is a flowchart diagram of an example process 400 for determining a scenario evaluation score associated with a first software component, a first operational scenario, a first operational domain, and a first energy level. As depicted in FIG. 4, at operations 402, 404, and 406, the process 400 includes identifying (e.g., receiving and/or determining) the first energy level, the first operational scenario, and the first operational domain respectively. The first operational domain may be determined based on a received operational domain identifier, such as the operational domain identifier 110 of FIG. 1.

At operation 408, the process 400 includes identifying a failure rate associated with the first operational scenario and the first operational domain. The scenario-specific fault rate may correspond to one of the S scenario-specific fault rates 128 of FIG. 1. The failure rate may be determined based on the techniques described in at least one of FIG. 1 or FIG. 3. However, a person of ordinary skill in the relevant technology will recognize that other techniques for determining failure rates for software components may also be used.

At operation 410, the process 400 includes determining a categorical exposure measure associated with the first operational scenario, the first operational domain, and the first energy level. The categorical exposure may represent a likelihood that the first software component may contribute to a loss associated with the first energy level when the vehicle is operating in accordance with the first operational scenario and the first operational domain. In some cases, categorical exposure measures (e.g., expected exposure rates) for different energy levels given specific driving scenarios are determined based on statistical data. This statistical data may be gathered through various sources, such as accident reports, police records, and surveys, and may be used to calculate the likelihood of an accident of a given severity under certain scenarios.

At operation 412, the process 400 includes determining a scenario evaluation measure associated with the first operational scenario, the first operational domain, and the first energy level. The scenario evaluation measure may correspond to one of the S*C scenario evaluation measures 132 of FIG. 1. The scenario evaluation measure may be determined based on (e.g., based on a product of) the failure rate and the scenario evaluation measure.

Figure 5:
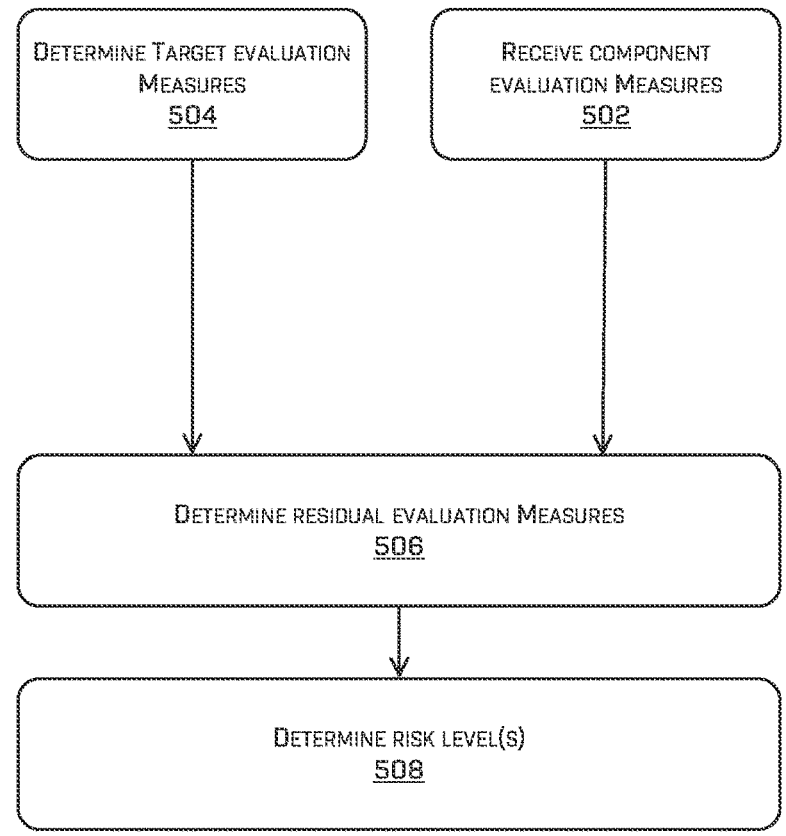
FIG. 5 is a flowchart diagram of an example process of determining one or more risk levels for a first software component.

FIG. 5 is a flowchart diagram of an example process of an example process 500 for determining one or more risk levels for a first software component. As depicted in FIG. 5, at operation 502, the process 500 includes receiving a set of component evaluation measures associated with the first software component. The set of component evaluation measures may include the set of C component evaluation measures 136 of FIG. 1. However, a person of ordinary skill in the relevant technology will recognize that other techniques for determining component evaluation measures for software components may also be used. In some cases, each component evaluation measure is associated with a respective one of C energy levels.

At operation 504, the process 500 includes determining a set of target evaluation measures. The set of target evaluation measures may include a set of C target evaluation measures. In some cases, each target evaluation measure is associated with a respective one of C energy levels.

The target evaluation measures may be determined in the same manner as the component evaluation measures are determined, except that in determining the target evaluation measures the weighted compliance ratio is set to a pre-defined value, such as to 100%. Accordingly, the target evaluation measures may be determined based on the set of criterion weights, as the set of criterion weights may be used to determine a weighted compliance ratio of 100%. The target evaluation measure may represent a component evaluation measure that is determined based on a base failure rate, where the base failure rate is determined based on a total (e.g., 100 percent) weighted compliance ratio. In other words, the target evaluation measure may represent what the component evaluation measure for the software component would be if the software component satisfied all of the compliance criteria associated with the component's risk category. In some cases, to determine the target evaluation measure for the software component, the example system: (i) determines a second base failure rate based on a predefined (e.g., total) weighted compliance ration, (ii) determines a second component failure rate based on the first base failure rate, (iii) determines a second set of scenario-specific fault rates based on (e.g., by applying a probability distribution to a variable determined based on) the second component failure rate (e.g., and at least one of the mitigation measure for the software component or a set of scenario exposure durations), (iv) determines a second set of scenario evaluation scores based on the second set of scenario-specific fault rates (e.g., and a set of categorical exposures measures), and (v) determines the set of target evaluation measures based on the second set of scenario evaluation scores (e.g., by combining the second scenario evaluation scores across energy levels).

At operation 506, the process 500 includes determining a set of residual evaluation measures. The set of residual evaluation measures may include a set of C residual evaluation measures. In some cases, each residual evaluation measure is associated with a respective one of C energy levels. In some cases, a residual evaluation measure of the C evaluation measures is determined based on a deviation of: (i) the component evaluation measure for the respective energy level, and (ii) the target evaluation measure for the respective energy level. For example, a residual evaluation measure of the C evaluation measures is determined based on the output of subtraction of the component evaluation measure for the respective energy level from the target evaluation measure for the respective energy level. A residual evaluation measure for the high energy level category may be calculated as the measure of deviation between: (i) a component evaluation measure that represents an expected risk of the associated software component contributing to collisions with the high energy level while the vehicle is operating in the associated operational domain, and (ii) a target evaluation measure that represents an expected risk of the associated software component contributing to collisions with the high energy level while the vehicle is operating in the associated operational domain if the software component satisfied all of the applicable compliance criteria.

At operation 508, the process 100 includes determining one or more risk levels. The risk levels may include the risk levels 140 of FIG. 1. Determining the risk levels may include: (i) mapping each residual evaluation measure to a respective risk level, and (ii) determine a component risk level based on at least one of the respective risk levels (e.g., based on the highest level of risk among the respective risk levels).

Figure 6:
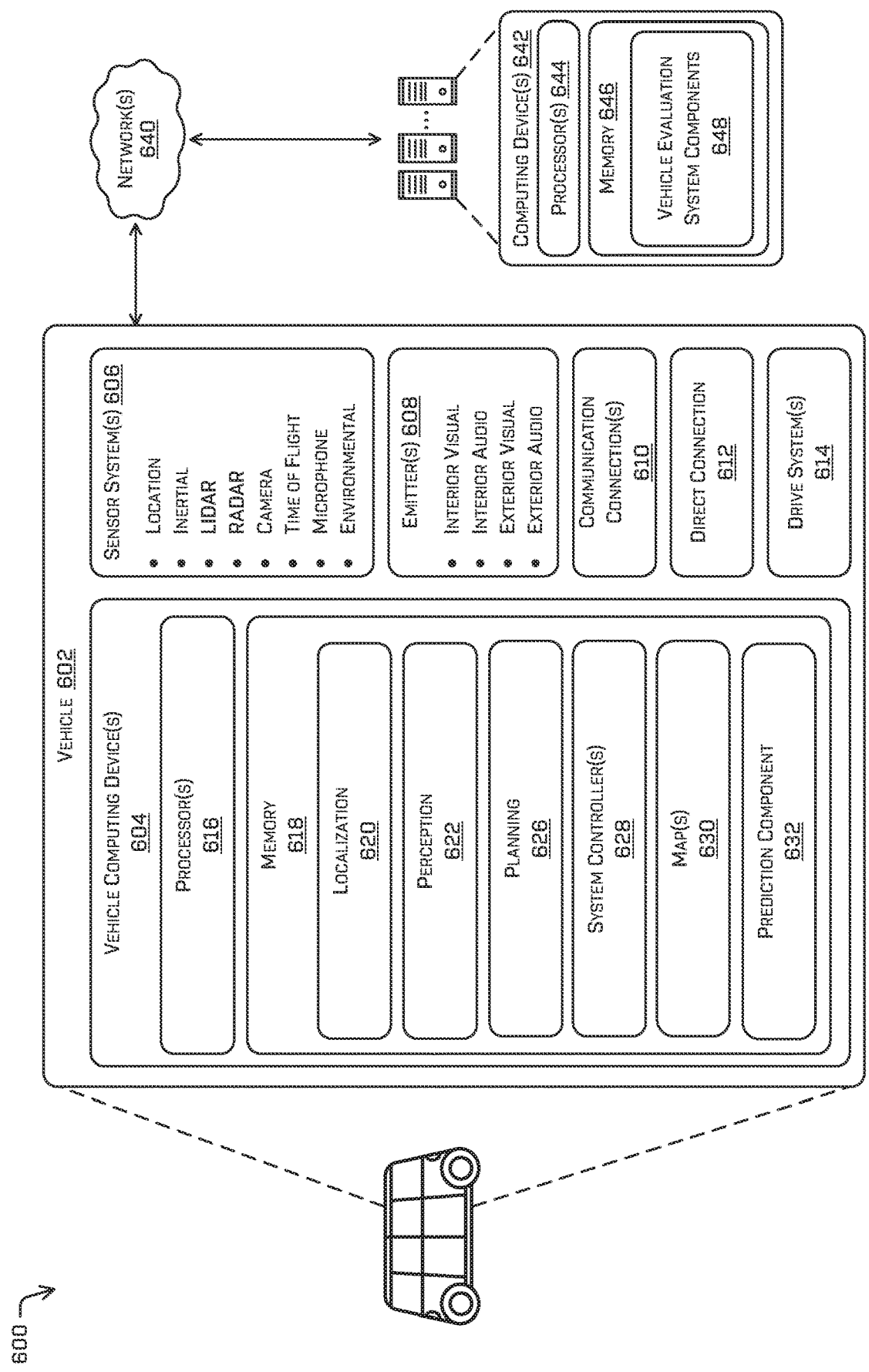
FIG. 6 depicts a block diagram of an example system for implementing the techniques described herein.

FIG. 6 depicts a block diagram of an example system 600 for implementing the techniques described herein. In at least one example, the system 600 can include a vehicle 602. The vehicle 602 can include various physical and/or software components that may be included in systems generated using the techniques described herein, such as a vehicle computing device 604, one or more sensor systems 606, one or more emitters 608, one or more communication connections 610, at least one direct connection 612, and one or more drive systems 614.

The vehicle computing device 604 can include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 604 stores a localization component 620, a perception component 622, a planning component 626, one or more system controllers 628, one or more maps 630, and a prediction component 632. Though depicted in FIG. 6 as residing in memory 618 for illustrative purposes, it is contemplated that the localization component 620, the perception component 622, the planning component 626, the one or more system controllers 628, the one or more maps 630, and the prediction component 632 can additionally, or alternatively, be accessible to the vehicle 602 (e.g., stored remotely).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and ca continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 can provide data to various components of the vehicle 602 to determine an initial position of an autonomous vehicle for generating a trajectory and/or for generating map data, as discussed herein.

In some instances, the perception component 622 can include functionality to perform object detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 626 can determine a path for the vehicle 602 to follow to traverse through an environment. For example, the planning component 626 can determine various routes and trajectories and various levels of detail. For example, the planning component 626 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 626 can generate an instruction for guiding the autonomous vehicle along at least a portion of the route from the first location to the second location. In at least one example, the planning component 626 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In at least one example, the vehicle computing device 604 can include one or more system controllers 628, which can be configured to control steering, propulsion, braking, safety, emitters, communication, and other systems of the vehicle 602. These system controller(s) 628 ca communicate with and/or control corresponding systems of the drive system(s) 614 and/or other components of the vehicle 602.

The memory 618 can further include one or more maps 630 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 630 can include at least one map (e.g., images and/or a mesh). In some examples, the vehicle 602 can be controlled based at least in part on the maps 630. That is, the maps 630 can be used in connection with the localization component 620, the perception component 622, and/or the planning component 626 to determine a location of the vehicle 602, identify objects in an environment, and/or generate routes and/or trajectories to navigate within an environment.

In some examples, the one or more maps 630 can be stored on a remote computing device(s) (such as the computing device(s) 642) accessible via network(s) 640. In some examples, multiple maps 630 can be stored based on, for example, a characteristic (e.g., type of entity, time of day, day of week, season of the year, etc.). Storing multiple maps 630 can have similar memory requirements but increase the speed at which data in a map can be accessed.

In general, the prediction component 632 can generate predicted trajectories of objects in an environment. For example, the prediction component 632 can generate one or more predicted trajectories for vehicles, pedestrians, animals, and the like within a threshold distance from the vehicle 602. In some instances, the prediction component 632 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 618 (and the memory 646, discussed below) can be implemented as a neural network.

As described herein, an exemplary neural network is an algorithm that passes input data through a series of connected layers to produce an output. Each layer in a neural network can also comprise another neural network or ca comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet60, ResNet101, VGG, DenseNet, PointNet, and the like.

In at least one example, the sensor system(s) 606 can include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 606 can include multiple instances of each of these or other types of sensors. For instance, the LIDAR sensors can include individual LIDAR sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604. Additionally, or alternatively, the sensor system(s) 606 can send sensor data, via the one or more networks 640, to the one or more computing device(s) at a particular frequency, after a lapse of a predetermined period of time, in near real-time, etc.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device 604 to another computing device or a network, such as network(s) 640. For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, RADAR sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 614. Furthermore, the drive system(s) 614 also include one or more communication connection(s) that enable communication by the respective drive system with one or more other local or remote computing device(s).

In at least one example, the direct connection 612 can provide a physical interface to couple the one or more drive system(s) 614 with the body of the vehicle 602. For example, the direct connection 612 can allow the transfer of energy, fluids, air, data, etc. between the drive system(s) 614 and the vehicle. In some instances, the direct connection 612 can further releasably secure the drive system(s) 614 to the body of the vehicle 602.

In some examples, the vehicle 602 can send sensor data to one or more computing device(s) 642 via the network(s) 640. In some examples, the vehicle 602 can send raw sensor data to the computing device(s) 642. In other examples, the vehicle 602 can send processed sensor data and/or representations of sensor data to the computing device(s) 642. In some examples, the vehicle 602 can send sensor data to the computing device(s) 642 at a particular frequency, after a lapse of a predetermined period of time, in near real-time, etc. In some cases, the vehicle 602 can send sensor data (raw or processed) to the computing device(s) 642 as one or more log files.

The computing device(s) 642 can include processor(s) 644 and a memory 646 storing one or more vehicle evaluation system components 648, such as those described herein. In some instances, the vehicle evaluation system components 648 can substantially correspond to the components of the vehicle evaluation system 102 (or otherwise as described herein) and can include functionality to iteratively generate one or more candidate systems and analyze the fitness of such systems.

The processor(s) 616 of the vehicle 602 and the processor(s) 644 of the computing device(s) 642 can be any suitable processor capable of executing instructions to process data and perform operations as described herein. By way of example and not limitation, the processor(s) 616 and 644 ca comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 646 are examples of non-transitory computer-readable media. The memory 618 and 646 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the vehicle 602 can be associated with the computing device(s) 642 and/or components of the computing device(s) 642 can be associated with the vehicle 602. That is, the vehicle 602 can perform one or more of the functions associated with the computing device(s) 642, and vice versa.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: receiving an exposure duration indicative of an expected length of exposure of a first software component of an autonomous vehicle to a first scenario while the autonomous vehicle is in a first operational domain; determining, based at least in part on the exposure duration and a failure rate associated with the first software component, a first fault rate for the first software component with respect to the first scenario and the first operational domain; determining a first evaluation measure for the first software component with respect to the first scenario, the first operational domain, and a first energy level, wherein the first evaluation measure is determined based at least in part on: (i) the first fault rate and (ii) an exposure measure indicative of an expected rate of exposure to the first energy level while the autonomous vehicle is in the first operational domain and operating in accordance with the first scenario; and based at least in part on the first evaluation measure, at least one of (i) controlling the autonomous vehicle, or (ii) causing the first software component to be updated.

B: The system of paragraph A, the operations further comprising: determining a base failure rate for the first software component based at least in part on a first risk category for the first software component; and determining the failure rate based at least in part on the base failure rate and at least one of: (i) a first single line of code (SLOC) count measure associated with the first software component, (ii) a second SLOC count measure associated with a safety-related subset of the first software component, or (iii) a diagnostic coverage measure associated with the autonomous vehicle.

C: The system of paragraph B, wherein determining the base failure rate comprises: receiving a first compliance criterion for the first energy level; and determining the base failure rate based at least in part on whether the first software component satisfies the first compliance criterion and a weight associated with the first compliance criterion.

D: The system of any of paragraphs A-C, wherein the operations comprise controlling the autonomous vehicle based at least in part on the first evaluation measure, and wherein controlling the autonomous vehicle comprises: determining a second evaluation measure for the first software component based on the first evaluation measure and one or more additional evaluation measures for one or more additional scenarios; receiving a third evaluation measure associated with the first software component based on a total satisfaction of a plurality of compliance criteria by compliance data for the first software component; determining, based on the second evaluation measure and the third evaluation measure, a component risk level for the first software component; and controlling the autonomous vehicle based on the component risk level.

E: The system of paragraph D, wherein the operations comprise controlling the autonomous vehicle based at least in part on the first evaluation measure, and wherein controlling the autonomous vehicle comprises: determining a vehicle risk level based on the component risk level; and controlling the autonomous vehicle in the first operational domain based at least in part on whether the vehicle risk level satisfies a threshold condition.

F: One or more non-transitory computer-readable media storing computer-executable instructions that, when executed, cause one or more processors to perform operations comprising: receiving an exposure duration indicative of an expected length of exposure of a first software component of a vehicle to a first scenario while the vehicle is in a first operational domain; determining, based on the exposure duration and a component failure rate for a first software component of a vehicle, a first evaluation measure for the first software component with respect to the first scenario, the first operational domain, and a first energy level; and based at least in part on the first evaluation measure, at least one of (i) controlling the vehicle, or (ii) causing the first software component to be updated.

G: The one or more non-transitory computer-readable media of paragraph F, wherein determining the first evaluation measure comprises: determining, based on the exposure duration and the component failure rate, a first fault rate for the first software component with respect to the first scenario and the first operational domain; and determining the first evaluation measure based on the first fault rate and a second exposure measure associated with the first scenario, the first operational domain, and the first energy level.

H: The one or more non-transitory computer-readable media of paragraph G, wherein determining the first fault rate comprises: determining a probability distribution for a variable determined based on the exposure duration and the component failure rate; and determining the first fault rate based on the probability distribution and a mitigation measure associated with the vehicle, wherein the mitigation measure represents an expected level of capability of the vehicle to prevent collisions resulting from failure of the first software component.

I: The one or more non-transitory computer-readable media of any of paragraphs F-H, the operations further comprising: determining a base failure rate for the first software component based on a first risk category for the first software component; and determining the component failure rate based on the base failure rate and at least one of: (i) a first single line of code (SLOC) count measure associated with the first software component, (ii) a second SLOC count measure associated with a first subset of the first software component, or (iii) a diagnostic coverage measure associated with the vehicle.

J: The one or more non-transitory computer-readable media of paragraph I, wherein determining the base failure rate comprises: receiving a first compliance criterion for the first energy level; and determining the base failure rate based on whether the first software component satisfies the first compliance criterion and a weight associated with the first compliance criterion.

K: The one or more non-transitory computer-readable media of any of paragraphs F-J, wherein the operations comprise controlling the vehicle based on the first evaluation measure, and wherein controlling the vehicle comprises: determining a second evaluation measure for the first software component based on the first evaluation measure and one or more additional evaluation measures for one or more additional scenarios; receiving a third evaluation measure associated with the first software component based on a weight and a maximum possible value for a first compliance criterion that is associated with the first software component; determining, based on the second evaluation measure and the third evaluation measure, a component risk level for the first software component; and controlling the vehicle based on the component risk level.

L: The one or more non-transitory computer-readable media of paragraph K, the operations further comprising: determining a second base failure rate for the first software component based on a weight and a maximum possible value associated with a set of compliance criteria for a first risk category of the first software component; determining a second component failure rate based on the second base failure rate and at least one of: (i) a first single line of code (SLOC) count measure associated with the first software component, (ii) a second SLOC count measure associated with a first subset of the first software component, or (iii) a diagnostic coverage measure associated with the vehicle; and determining, based on the second component failure rate, the third evaluation measure.

M: The one or more non-transitory computer-readable media of paragraph K or L, wherein controlling the vehicle further comprises: determining a vehicle risk level based on the component risk level; and controlling the vehicle in the first operational domain based on whether the vehicle risk level satisfies a threshold condition.

N: The one or more non-transitory computer-readable media of paragraph M, wherein controlling the vehicle further comprises: based on determining that the vehicle risk level fails to satisfy the threshold condition, determining a path for the vehicle that avoids a region associated with the first operational domain; and controlling the vehicle based on the path.

O: The one or more non-transitory computer-readable media of paragraph N, wherein controlling the vehicle further comprises: based on determining that the vehicle risk level fails to satisfy the threshold condition, controlling the vehicle based on a stopping trajectory when the vehicle is detected to be in a region associated with the first operational domain.

P: A method comprising: receiving an exposure duration indicative of an expected length of exposure of a first software component of a vehicle to a first scenario while the vehicle is in a first operational domain; determining, based on the exposure duration and a component failure rate for a first software component of a vehicle, a first evaluation measure for the first software component with respect to the first scenario, the first operational domain, and a first energy level; and controlling the vehicle based on the first evaluation measure.

Q: The method of paragraph P, wherein determining the first evaluation measure comprises: determining, based on the exposure duration and the component failure rate, a first fault rate for the first software component with respect to the first scenario and the first operational domain; and determining the first evaluation measure based on the first fault rate and a second exposure measure associated with the first scenario, the first operational domain, and the first energy level.

R: The method of paragraph Q, wherein determining the first fault rate comprises: determining a probability distribution for a variable determined based on the exposure duration and the component failure rate; and determining the first fault rate based on the probability distribution and a mitigation measure associated with the vehicle.

S: The method of any of paragraphs P-R, further comprising: determining a base failure rate for the first software component based on a first risk category for the first software component; and determining the component failure rate based on the base failure rate and at least one of: (i) a first single line of code (SLOC) count measure associated with the first software component, (ii) a second SLOC count measure associated with a first subset of the first software component, or (iii) a diagnostic coverage measure associated with the vehicle.

T: The method of paragraph S, wherein determining the base failure rate comprises: receiving a first compliance criterion for the first energy level; and determining the base failure rate based on whether the first software component satisfies the first compliance criterion and a weight associated with the first compliance criterion.

What is claimed is:

1. A system comprising:
one or more processors; and
one or more non-transitory computer-readable media storing computer-executable instructions that, when executed, cause the one or more processors to perform operations comprising:
  receiving an exposure duration indicative of an expected length of exposure of a first software component of an autonomous vehicle to a first scenario while the autonomous vehicle is in a first operational domain;
  determining a base failure rate for the first software component based at least in part on a first risk category for the first software component;
  determining a failure rate associated with the first software component based at least in part on the base failure rate and at least one of: (i) a first single line of code (SLOC) count measure associated with the first software component, (ii) a second SLOC count measure associated with a safety-related subset of the first software component, or (iii) a diagnostic coverage measure associated with the autonomous vehicle;
  determining, based at least in part on the exposure duration and the failure rate, a first fault rate for the first software component with respect to the first scenario and the first operational domain;
  determining a first evaluation measure for the first software component with respect to the first scenario, the first operational domain, and a first energy level, wherein the first evaluation measure is determined based at least in part on: (i) the first fault rate and (ii) an exposure measure indicative of an expected rate of exposure to the first energy level while the autonomous vehicle is in the first operational domain and operating in accordance with the first scenario; and
  based at least in part on the first evaluation measure, at least one of (i) controlling the autonomous vehicle, or (ii) causing the first software component to be updated.

2. The system of claim 1, wherein determining the base failure rate comprises:
  receiving a first compliance criterion for the first energy level; and
  determining the base failure rate based at least in part on whether the first software component satisfies the first compliance criterion and a weight associated with the first compliance criterion.

3. The system of claim 1, wherein the operations comprise controlling the autonomous vehicle based at least in part on the first evaluation measure, and wherein controlling the autonomous vehicle comprises:
  determining a second evaluation measure for the first software component based on the first evaluation measure and one or more additional evaluation measures for one or more additional scenarios;
  receiving a third evaluation measure associated with the first software component based on a total satisfaction of a plurality of compliance criteria by compliance data for the first software component;
  determining, based on the second evaluation measure and the third evaluation measure, a component risk level for the first software component; and
  controlling the autonomous vehicle based on the component risk level.

4. The system of claim 3, wherein the operations comprise controlling the autonomous vehicle based at least in part on the first evaluation measure, and wherein controlling the autonomous vehicle comprises:
  determining a vehicle risk level based on the component risk level; and
  controlling the autonomous vehicle in the first operational domain based at least in part on whether the vehicle risk level satisfies a threshold condition.

5. One or more non-transitory computer-readable media storing computer-executable instructions that, when executed, cause one or more processors to perform operations comprising:
  receiving an exposure duration indicative of an expected length of exposure of a first software component of a vehicle to a first scenario while the vehicle is in a first operational domain;
  determining a base failure rate for the first software component based on a first risk category for the first software component;
  determining a component failure rate for the first software component based on the base failure rate and at least one of: (i) a first single line of code (SLOC) count measure associated with the first software component, (ii) a second SLOC count measure associated with a first subset of the first software component, or (iii) a diagnostic coverage measure associated with the vehicle;
  determining, based on the exposure duration and the component failure rate, a first evaluation measure for the first software component with respect to the first scenario, the first operational domain, and a first energy level; and
  based at least in part on the first evaluation measure, at least one of (i) controlling the vehicle, or (ii) causing the first software component to be updated.

6. The one or more non-transitory computer-readable media of claim 5, wherein determining the first evaluation measure comprises:
  determining, based on the exposure duration and the component failure rate, a first fault rate for the first software component with respect to the first scenario and the first operational domain; and determining the first evaluation measure based on the first fault rate and a second exposure measure associated with the first scenario, the first operational domain, and the first energy level.

7. The one or more non-transitory computer-readable media of claim 6, wherein determining the first fault rate comprises:

determining a probability distribution for a variable determined based on the exposure duration and the component failure rate; and determining the first fault rate based on the probability distribution and a mitigation measure associated with the vehicle, wherein the mitigation measure represents an expected level of capability of the vehicle to prevent collisions resulting from failure of the first software component.

8. The one or more non-transitory computer-readable media of claim 5, wherein determining the base failure rate comprises:

receiving a first compliance criterion for the first energy level; and determining the base failure rate based on whether the first software component satisfies the first compliance criterion and a weight associated with the first compliance criterion.

9. The one or more non-transitory computer-readable media of claim 5, wherein the operations comprise controlling the vehicle based on the first evaluation measure, and wherein controlling the vehicle comprises:

determining a second evaluation measure for the first software component based on the first evaluation measure and one or more additional evaluation measures for one or more additional scenarios;

receiving a third evaluation measure associated with the first software component based on a weight and a maximum possible value for a first compliance criterion that is associated with the first software component;

determining, based on the second evaluation measure and the third evaluation measure, a component risk level for the first software component; and controlling the vehicle based on the component risk level.

10. The one or more non-transitory computer-readable media of claim 9, the operations further comprising:

determining a second base failure rate for the first software component based on a weight and a maximum possible value associated with a set of compliance criteria for a first risk category of the first software component;

determining a second component failure rate based on the second base failure rate and at least one of: (i) a third SLOC count measure associated with the first software component, (ii) a fourth SLOC count measure associated with a first subset of the first software component, or (iii) the diagnostic coverage measure associated with the vehicle; and determining, based on the second component failure rate, the third evaluation measure.

11. The one or more non-transitory computer-readable media of claim 9, wherein controlling the vehicle further comprises:

determining a vehicle risk level based on the component risk level; and controlling the vehicle in the first operational domain based on whether the vehicle risk level satisfies a threshold condition.

12. The one or more non-transitory computer-readable media of claim 11, wherein controlling the vehicle further comprises:

based on determining that the vehicle risk level fails to satisfy the threshold condition, determining a path for the vehicle that avoids a region associated with the first operational domain; and controlling the vehicle based on the path.

13. The one or more non-transitory computer-readable media of claim 12, wherein controlling the vehicle further comprises:

based on determining that the vehicle risk level fails to satisfy the threshold condition, controlling the vehicle based on a stopping trajectory when the vehicle is detected to be in a region associated with the first operational domain.

14. A method comprising:

receiving an exposure duration indicative of an expected length of exposure of a first software component of a vehicle to a first scenario while the vehicle is in a first operational domain;

determining a base failure rate for the first software component based on a first risk category for the first software component;

determining a component failure rate for the first software component based on the base failure rate and at least one of: (i) a first single line of code (SLOC) count measure associated with the first software component, (ii) a second SLOC count measure associated with a first subset of the first software component, or (iii) a diagnostic coverage measure associated with the vehicle;

determining, based on the exposure duration and the component failure rate, a first evaluation measure for the first software component with respect to the first scenario, the first operational domain, and a first energy level; and based at least in part on the first evaluation measure, at least one of (i) controlling the vehicle, or (ii) causing the first software component to be updated.

15. The method of claim 14, wherein determining the first evaluation measure comprises:

determining, based on the exposure duration and the component failure rate, a first fault rate for the first software component with respect to the first scenario and the first operational domain; and determining the first evaluation measure based on the first fault rate and a second exposure measure associated with the first scenario, the first operational domain, and the first energy level.

16. The method of claim 15, wherein determining the first fault rate comprises:

determining a probability distribution for a variable determined based on the exposure duration and the component failure rate; and determining the first fault rate based on the probability distribution and a mitigation measure associated with the vehicle.

17. The method of claim 14, wherein determining the base failure rate comprises:

receiving a first compliance criterion for the first energy level; and determining the base failure rate based on whether the first software component satisfies the first compliance criterion and a weight associated with the first compliance criterion.

* * * * *